United States Patent
Gines

(10) Patent No.: US 7,227,980 B2
(45) Date of Patent: Jun. 5, 2007

(54) SYSTEMS AND METHODS FOR TOMOGRAPHIC RECONSTRUCTION OF IMAGES IN COMPRESSED FORMAT

(75) Inventor: David Lee Gines, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 936 days.

(21) Appl. No.: 10/324,495

(22) Filed: Dec. 19, 2002

(65) Prior Publication Data

US 2004/0120564 A1 Jun. 24, 2004

(51) Int. Cl.
*G06K 9/00* (2006.01)

(52) U.S. Cl. ...................... 382/131; 382/240

(58) Field of Classification Search ............... None
See application file for complete search history.

(56) References Cited

U.S. PATENT DOCUMENTS

| | | | |
|---|---|---|---|
| 4,920,491 A * | 4/1990 | Eberhard et al. | 382/131 |
| 5,461,655 A | 10/1995 | Vuylsteke et al. | |
| 5,644,662 A | 7/1997 | Vuylsteke | |
| 5,841,890 A | 11/1998 | Kraske | |
| 5,953,388 A | 9/1999 | Walnut et al. | |
| 6,041,135 A | 3/2000 | Buytaert et al. | |
| 6,078,680 A | 6/2000 | Yoshida et al. | |
| 6,091,846 A * | 7/2000 | Lin et al. | 382/145 |
| 6,324,249 B1 * | 11/2001 | Fazzio | 378/22 |
| 6,351,548 B1 | 2/2002 | Basu et al. | |
| 6,678,404 B1 * | 1/2004 | Lee et al. | 382/155 |

OTHER PUBLICATIONS

"A Fast Tomographic Reconstruction Algorithm in the 2-d Wavelet Transformation Domain," Blanc-Feraud, L. et al., 1994 International Conference on Acoustics, Speech, and Signal Processing, vol. V, Apr. 19-22, 1994, pp. v305-v308.*
I. Daubechies, "Orthonormal Bases of Compactly Supported Wavelets," Communications of Pure and Applied Mathematics, vol. XLI, 1988, pp. 909-996.
S. Mallat, "A Theory for Multiresolution Signal Decomposition: The Wavelet Representation," IEEE Transactions on Pattern Analysis and Machine Intellgence, vol. II, No. 7, Jul. 1989, pp. 674-693.
G. Beylkin et al., "Fast Wavelet Transformsa nd Numerical Algorithms I," Communications on Pure and Applied Mathematics, vol. XLIV, 1991, pp. 141-183.
J.DeStefano et al., "Wavelet Localization of the Radon Transform in Even Demensions," IEEE, 1992, pp. 137-140.
N. Srinivasa et al., "Detection of Edges from Projections," IEEE Transactions on Medical Imaging, vol. II, No. 1, Mar. 1992, pp. 76-80.

(Continued)

*Primary Examiner*—Wenpeng Chen

(57) ABSTRACT

Disclosed are methods and systems for tomographic reconstructing of desired image data from image data corresponding to a plurality of detector images comprising compressing the plurality of detector images, identifying a projection matrix which describes an ideal way in which an object under study is projected onto a detector, computing a modified projection matrix as a function of the projection matrix and a compression technique utilized in compressing the plurality of detected images, and reconstructing a compressed representation of the desired image data from the compressed detector images and the modified projection matrix, using an iterative linear systems solver.

15 Claims, 3 Drawing Sheets

OTHER PUBLICATIONS

T. Olson, "Limited Angle Tomography Via Multiresolution Analysis and Oversampling," IEE, 1992, pp. 215-218.

D. Donoho, Department of Statistics, Stanford University, Nolinear Solution of Linear Inverse Problesms by Wavelet-Vaguelette Decomposition, Apr. 1992, pp. 1-46.

B. Sahiner et al., "On the Use of Wavelets in Inverting the Radon Transform," IEEE, 1993, pp. 1129-1131.

E. Piccolomini et al., "The Conjugate Gradient Regularization Method in Computed Tomography Problems," Applied Mathematics and Computation, 1994, pp. 1-14.

M. Bhatia et al., "Wavelet Based Methods for Multiscale Tomographic Reconstruction," IEEE, 1994, pp. 2a-3-a.

T. Olson et al., "Wavelet Localization of the Radon Transform," IEEE Transactions on Signal Processing, vol. 42, No. 8, Aug. 1994, pp. 2055-2067.

E. Kolaczyk, "Wavelet Shrinkage in Tomography," IEEE 1994, pp. 1206-1207.

A. Yagle, Region-of-Interest Tomography Using the Wavelet Transform and Angular Harmonics, IEEE, 1995, pp. 461-463.

A. Warrick et al., "A Wavelet Localized Radon Transform Based Detector for a Signal with Unknown Parameters," IEEE, 1996, pp. 860-864.

A. Warrick et al., "Detection of Linear Features Using a Localized Radon Transform with a Wavelet Filter," IEEE, 1997, pp. 2769-2772.

W. Zhu et al., "A Wavelet-Based Multiresolution Regularized Least Squares Reconstruction Approach for Optical Tomography," IEEE Transactions on Medical Imaging, vol. 16, No. 2, Apr. 1997, pp. 210-217.

F. Rashid-Farrokhi et al., "Wavelet-Based Multiresolution Local Tomography," IEEE Transactions on Image Processing, vol. 6, No. 10, Oct. 1997, pp. 1412-1430.

A. Bronnikov et al., Wavelet-Based Image Enhancement in X-ray Imaging and Tomography, Applied Optics, vol. 37, No. 20, Jul. 10, 1998, pp. 4437-4447.

J. Fessler et al., "Conjugate-Gradient Preconditioning Methods for Shift-Varieant PET Image Reconstruction," IEEE Transactions on Image Processing, vol. 8, No. 5, May 1999, pp. 688-699.

B. Alpert et al., "Adaptive Solution of Partial Differential Equations in Multiwavelet Bases," May 6, 1999, pp. 1-43.

S. Nath et al., "Wavelet Based Compression and Denoising of Optical Tomography Data," Optics Communications, Aug. 15, 1999, pp. 37-46.

Nam-Yong Lee et al., "Wavelet Methods for Inverting the Radon Transform with Noisy Data," IEEE Transactions on Image Processing, vol. 10, No. 1, Jan. 2001, pp. 79-94.

M. Wang, "Inverse Solutions for Electrical Impedance Tomography Based on Conjugate Gradients Methods," Institute of Physics Publishing, Measurement Science and Technology, 2002, pp. 101-117.

D. Gines et al., "LU Factorization of Non-Standard Forms and Direct Multiresolution Solvers," Department of Electrical Engineering & Program in Applied Mathematics, University of Colorado, pp. 2-72.

* cited by examiner

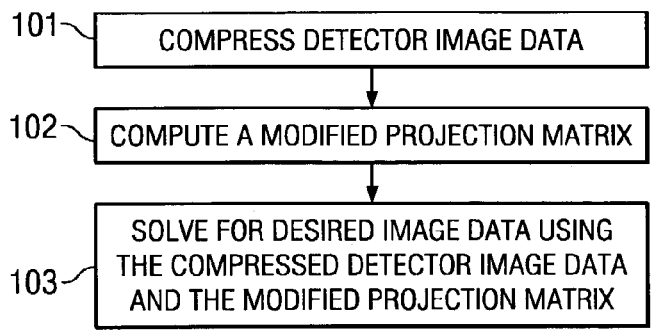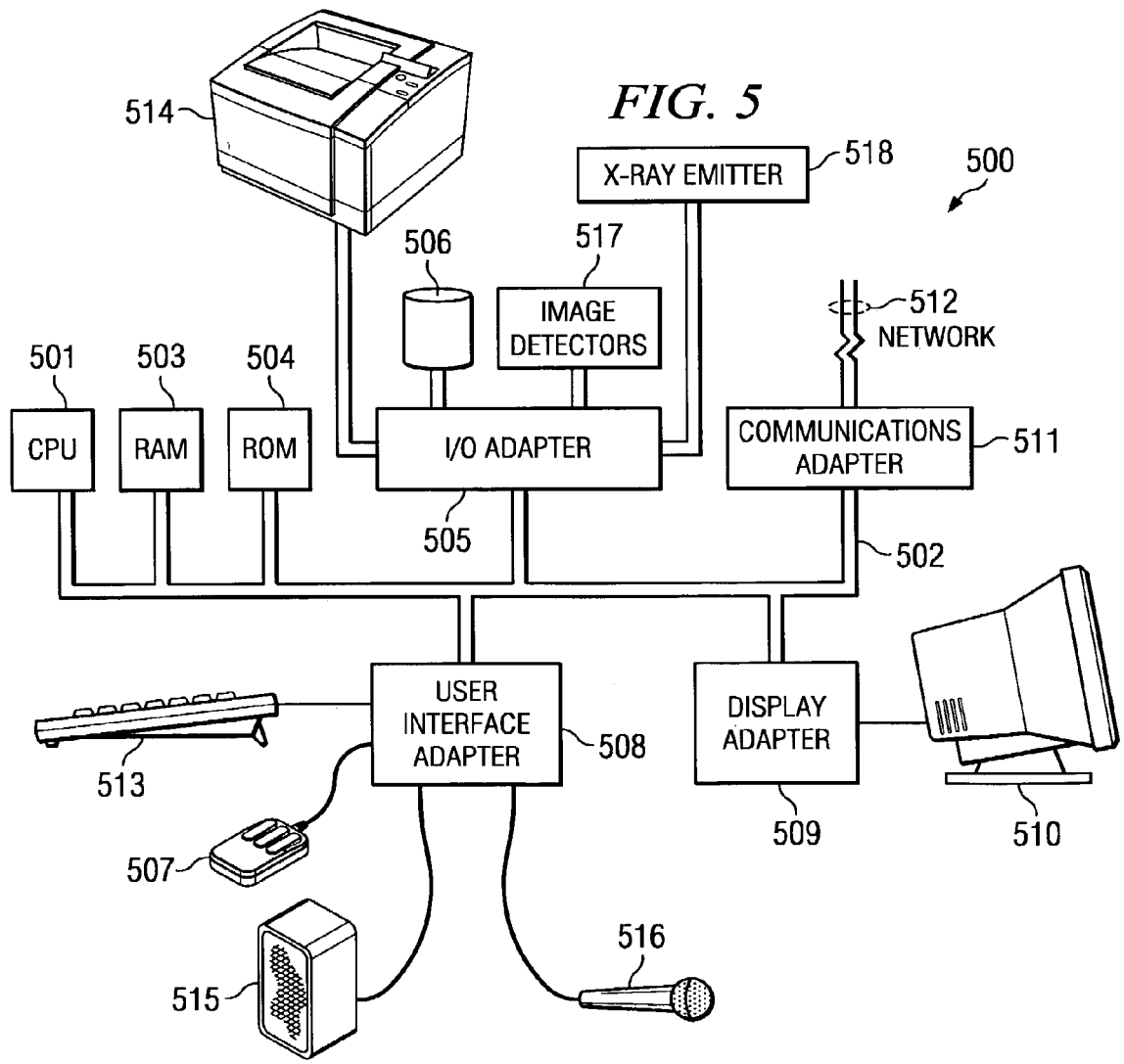

SYSTEMS AND METHODS FOR TOMOGRAPHIC RECONSTRUCTION OF IMAGES IN COMPRESSED FORMAT

CROSS-REFERENCE TO RELATED APPLICATIONS

The present application is related to U.S. patent application Ser. No. 10/643,728, filed Aug. 19, 2003, U.S. Publication No. 2005/0041781, published Feb. 24, 2005, entitled A SYSTEM AND METHOD FOR PARALLEL IMAGE RECONSTRUCTION OF MULTIPLE DEPTH LAYERS OF AN OBJECT UNDER INSPECTION FROM RADIOGRAPHIC IMAGES, to U.S. patent application Ser. No. 10/651,378, filed Aug. 29, 2005, U.S. Publication No. 2005/0047637, published Mar. 3, 2005, entitled IMAGE BUFFERS AND ACCESS SCHEDULES FOR IMAGE RECONSTRUCTION SYSTEMS, to U.S. patent application Ser. No. 10/684,000, filed Oct. 10, 2003, U.S. Publication No. 2004/0120566, published Apr. 14, 2005, entitled COMPACT STORAGE OF PROJECTION MATRIX FOR TOMOGRAPHY USING SEPARABLE OPERATORS, and to U.S. patent application Ser. No. 10/325,331, filed Dec. 19, 2002, U.S. Publication No. 2004/0120566, published Jun. 24, 2004, entitled MAKING 3D CONE-BEAM TOMOGRAPHY FORM ARBITRARY LOCATED X-RAY SOURCES AND IMAGERS BY APPLYING THE CONJUGATE METHOD, all of which are incorporated herein in their entireties by reference.

TECHNICAL FIELD

The present invention relates in general to image processing, and more particularly to systems and methods for tomographic reconstruction of images in compressed format.

BACKGROUND OF THE INVENTION

It is often desired to construct a cross-sectional view (layer or slice) and/or three dimensional (3D) view of an object for which actually presenting such views is impossible, such as due to irreparably damaging the object. For example, imaging systems are utilized in the medical arts to provide a view of a slice through a living human's body and to provide 3D views of organs therein. Similarly, imaging systems are utilized in the manufacture and inspection of industrial products, such as electronic circuit boards and/or components, to provide layer views and 3D views for inspection thereof.

Often desired images are provided through reconstruction techniques which use multiple two-dimensional (2D) radiographic, e.g., X band radiation (X-ray), images, e.g., detector images. The technique of reconstructing a desired image or view of an object (be it a 3D image, a cross-sectional image, and/or the like) from multiple projections (e.g., different detector images) is broadly referred to as tomography. When such reconstructing of a cross-sectional image is performed with the aid of a processor-based device (or "computer"), the technique is broadly referred to as computed (or computerized) tomography (CT). In a typical example application, a radiation source projects X band radiation through an object onto an electronic sensor array thereby providing a detector image. By providing relative movement between one or more of the object, the source, and the sensor array, multiple views (multiple detector images having different perspectives) may be obtained. An image of a slice through the object or a three-dimensional ("3D") image of the object may then be approximated by use of proper mathematical transforms of the multiple views. That is, cross-sectional images of an object may be reconstructed, and in certain applications such cross-sectional images may be combined to form a 3D image of the object.

Three-dimensional computed tomography has the potential for more accurate image reconstruction than laminography or tomosynthesis, but at the expense of speed (computation time). Three-dimensional computed tomography typically requires many projections, and is computationally intensive. One approach to three-dimensional computer-aided tomography is to position an X-ray source having a cone-shaped three-dimensional ray output on one side of an object to be viewed, position a two-dimensional array of sensors on the opposite side of the object to be viewed, and synchronously move the source/array relative to the object. There are many suitable scan paths. For example, the source may be moved in orthogonal circles around the object to be viewed, or the source may be moved along a helical path or other path along a cylinder surrounding the object to be viewed. This approach, known as "cone-beam tomography," is preferable in many cases for reconstructing cross-sectional images, and is potentially preferable for industrial inspection systems (e.g., for electronic assembly analysis) because of the resulting image quality.

Perhaps the best known practical application of X-ray absorption tomography is the medical computerized tomography scanner (CT Scanner, also called computer-aided tomography or computerized axial tomography (CAT)). For instance, cross-sectional image reconstruction from radiographic (e.g., X-ray) images is commonly used in medical applications to generate a cross-sectional image (and/or 3D view) of the human body or part of the human body from an X-ray image. In those applications, speed of reconstruction of the cross-sectional images is typically not very important. However, as medical procedures continue to evolve, certain medical applications are beginning to desire fast reconstruction of cross-sectional images. For instance, real-time X-ray imaging is increasingly being desired by medical procedures, such as many electro-physiologic cardiac procedures, peripheral vascular procedures, percutaneous transluminal catheter angioplasty (PTCA) procedures, urological procedures, and orthopedic procedures, as examples.

Tomography is also of interest in automated inspection of industrial products. For instance, reconstruction of cross-sectional images from radiographic (e.g., X-ray) images has been utilized in quality control inspection systems for inspecting a manufactured product, such as electronic devices (e.g., printed circuit boards). That is, tomography may be used in an automated inspection system to reconstruct images of one or more planes (which may be referred to herein as "depth layers" or "cross-sections") of an object under study in order to evaluate the quality of the object (or portion thereof). An X-ray imaging system may create 2-dimensional detector images (layers, or slices) of a circuit board at various locations and at various orientations. Primarily, one is interested in images which lie in the same plane as the circuit board. In order to obtain these images at a given region of interest, raw X-ray detector images may be mathematically processed using a reconstruction algorithm.

For instance, a printed circuit board (or other object under study) may comprise various depth layers of interest for inspection. As a relatively simple example, a dual-sided printed circuit board may comprise solder joints on both sides of the board. Thus, each side of the circuit board on which the solder joints are arranged may comprise a separate layer of the board. Further, the circuit board may comprise surface mounts (e.g., a ball grid array of solder) on each of its sides, thus resulting in further layers of the board. The object under study may be imaged from various different angles (e.g., by exposure to X-rays at various different angles) resulting in radiographic images of the object, and such radiographic images may be processed to reconstruct an image of a layer (or "slice") of the object. Thereafter, the resulting cross-sectional image(s) may, in some inspection systems, be displayed layer by layer, and/or such cross-sectional images may be used to reconstruct a full 3D visualization of the object under inspection.

Various mathematical algorithms have been developed for the tomographic reconstruction of images, see e.g., Natterer, et al., "Mathematical Methods in Image Reconstruction", Society for Industrial and Applied Mathematics, Philadelphia, Pa., 2001, the disclosure of which is incorporated herein by reference. The most popular of these is "Filtered Back-Projection" (FBP), which is a fast, approximate reconstruction method based on the Fourier transform of the projection data. When the projection data is relatively complete i.e., is sampled at a sufficient number of angles and the data is relatively noise-free, this method is both fast and accurate. Medical systems for tomography often meet these criteria, thus leading to the method's popularity. In many medical applications, however, such as X-ray mammography, and in most industrial applications, limitations of speed, accessibility, and/or cost, may reduce the overall coverage and quality of data.

"Limited-Angle Tomography" is a field of tomography comprising methods which attempt to address the above limitations, see e.g., M. E. Davison, "The Ill-Conditioned Nature of the Limited Angle Tomography Problem", SIAM J. Appl. Math, 43, pp. 428–448, April 1983, and Louis, et al., "Incomplete Data Problems in X-Ray Computerized Tomography II", Num. Mathematik, 56, pp. 371–383, 1989, the disclosures of which are incorporated herein by reference. Popular reconstruction methods for Limited-Angle Tomography rely on a matrix representation of the Radon Transform, see e.g., Llacer, et al., "Matrix Based Image Reconstruction Methods for Tomography", IEEE Transactions on Nuclear Science, Vol. NS-32, No. 1, pp. 855–864, February 1985, the disclosure of which is incorporated herein by reference. The Conjugate Gradient method is an iterative solution that has shown some promise in solving the Radon Transform, potentially reducing the computational-burden and reconstruction time considerably, see e.g. Piccolomini, et al., "The Conjugate Gradient Regularization Method in Computed Tomography Problems", Applied Mathematics and Computation, Vol. 102, Issue 1, pp. 87–99, 1 July 1999; Fessler, et al., "Conjugate-Gradient Preconditioning Methods for Shift-Variant PET Image Reconstruction", IEEE Transactions on Image Processing, Vol. 8, Issue 5, pp. 688–699, 1999; Kawata, et al., "Constrained Iterative Reconstruction by the Conjugate Gradient Method Measurement Science & Technology", IEEE Transactions on Medical Imaging, Vol. MI-4, Issue 2, pp. 65–71, 1985; and M. Wang, "Inverse Solutions for Electrical Impedance Tomography Based on Conjugate Gradients Methods", Measurement Science & Technology Vol. 13, Issue 1, pp. 101–117, 2002; and the above referenced patent application entitled "MAKING 3D CONE-BEAM TOMOGRAPHY FROM ARBITRARY LOCATED X-RAY SOURCES AND IMAGERS BY APPLYING THE CONJUGATE METHOD", U.S. patent application Ser. No. 10/325,331, filed Dec. 19, 2002, U.S. Publication No. 2004/0120566, published Jun. 24, 2004, the disclosure of which is incorporated herein by reference. It should be noted, however, that because of the fine resolution required by a real-world inspection system, the amount of data that must be processed may be prohibitive.

In a standard cone-beam tomographic reconstruction algorithm, for example, the image data is represented as an array of pixels, where the value of each pixel represents the sampled value of the image at that location. If, for example, 10 projection images are obtained from a detector consisting of 1000×1000 pixels, the total number of rows/columns in a square linear system is $10^7$. It can be readily appreciated that, particularly for large images, the computational cost for computing each pixel in a reconstructed image is prohibitive. Moreover, the amount of computer memory required to store all of the detector images used in the reconstruction of images is prohibitive. In addition, the transmission of such image data, such as along a pipeline within the imaging system, is burdensome on system resources and prone to latencies due to the size of such image data.

The literature contains many examples of methods designed to improve the quality and/or speed of tomographic image reconstruction. Recently, multiresolution methods based on hierarchical functions, especially wavelets see e.g. I. Daubechies, "Orthonormal Bases of Compactly Supported Wavelets", Comm. Pure and Appl. Math, Vol. 41, pp. 909–996, 1988; S. G. Mallat, "A Theory for Multiresolution Signal Decomposition: the Wavelet Representation", IEEE Transactions on Pattern Analysis and Machine Intelligence, Vol. 11, Issue 7, pp. 674–693, 1989; and Beylkin, et al., "Fast Wavelet Transforms and Numerical Algorithms I", Comm. Pure and Appl. Math., Vol. 44, pp. 141–183, 1991; the disclosures of which are incorporated herein by reference, have been the focus of much research. In the area of tomography, the application of wavelets falls generally into a few categories.

A first category of wavelet application in tomography is in the use of FBP algorithm. Researchers have focused on the use of wavelets with the FBP algorithm primarily with applications in the medical industry. Here the emphasis is on reducing the patient's exposure to X band radiation by constructing a "region of interest" based method that requires fewer X-ray projections to be taken. Although these methods are not truly local, by incorporating wavelet filtering into filtered back-projection, one may construct a "near-local" representation of the global Radon transform (see e.g. Rashid-Farrokhi, et al., "Wavelet-Based Multiresolution Local Tomography", IEEE Transactions on Image Processing, Vol. 6, Issue 10, pp. 1412–1430, 1997; Olson, et al., "Wavelet Localization of the Radon Transform", IEEE Transactions on Signal Processing, Vol. 42, Issue 8, pp. 2055–2067, 1994; DeStefano et al., "Wavelet Localization of the Radon Transform in Even Dimensions", Time-Frequency and Time-Scale Analysis, 1992, Proceedings of the IEEE-SP International Symposium, pp. 137–140, 4–6 Oct. 1999; Warrick, et al., "A Wavelet Localized Radon Transform", Proceedings of the SPIE—The International Society for Optical Engineering, Vol. 2569, Part 2, pp. 632–643, 1995; Warrick, et al., "A Wavelet Localized Radon Transform Based Detector for a Signal with Unknown Parameters", Signals, Systems and Computers, Vol. 2, pp. 860–864, Oct. 30, 1995–Nov. 2, 1995; Sahiner, et al., "On the Use of Wavelets in Inverting the Radon Transform", Nuclear Science Symposium and Medical Imaging Conference, 1992, IEEE, Vol. 2, pp. 1129–1131, 25–31 Oct. 1992; A. E. Yagle, "Region-of-Interest Tomography Using the Wavelet Transform and Angular Harmonics", Image Processing, Proceedings, Vol 2, pp. 461–463, 23–26 Oct. 1995;

and U.S. Pat. Nos. 5,953,388 and 5,841,890, the disclosures of which are incorporated herein by reference) which results in substantially smaller doses of X band radiation for the patient. These methods are not particularly useful in industrial applications, however, since there is little motivation to reduce dose levels, and because of the limited angle problem.

A second category of wavelet application in tomography is in the area of feature extraction and de-noising. As is well known in the literature, wavelets provide an excellent framework for distinguishing between signal and noise. Reconstructed image quality may be improved by using de-noising techniques comprising applying a wavelet transform and using various analysis methods to modify the data, see e.g., Bronnikov, et al., "Wavelet-Based Image Enhancement in X-ray Imaging and Tomography", Applied Optic, Vol. 37, Issue 20, pp. 4437–4448, 1998; M. D. Harpen, "A Computer Simulation of Wavelet Noise Reduction in Computed Tomography", Medical Physics, Vol. 26, Issue 8, pp. 1600–1606, August 1999; Lee, et al., "Wavelet Methods for Inverting the Radon Transform with Noisy Data", IEEE Transactions on Image Processing, Vol. 10, Issue 1, pp. 79–94, January 2001; E. D. Kolaczyk, "Wavelet Shrinkage in Tomography", Engineering in Medicine and Biology Society, Proceedings of the 16$^{th}$ Annual Inernational Confrerence of the IEEE, Vol. 2, pp. 1206–1207, 1994; and U.S. Pat. No. 5,461,655, the disclosures of which are incorporated herein by reference. Similarly, one may apply wavelet transforms to projections (detector images), and isolate signals or features of interest (such as edges), causing the resulting reconstruction to correspond only to those features, see e.g., Srinivasa, et al., "Detection of Edges from Projections", IEEE Transactions on Medical Imaging, Vol. 11, Issue 1, pp. 76–80, March 1992; Warrick, et al., "Detection of Linear Features Using a Localized Radon Transform with a Wavelet Filter", Acoustics, Speech, and Signal Processing, 1997, ICASSP-97., 1997 IEEE International Conference, Vol. 4, pp. 2769–2772, 21–24 Apr. 1997; and U.S. Pat. No. 6,078,680, the disclosures of which are incorporated herein by reference. When select features are isolated, the resulting representation may be stored efficiently in a compressed format, leading to reduced storage requirements or more efficient post-processing algorithms, see e.g., D. Gines, "LU Factorization of Non-Standard Forms and Direct Multiresolution Solvers", Applied and Computational Harmonic Analysis, Vol. 5, Issue 2, pp. 156–201, 1998 and U.S. Pat. Nos. 5,644,662 and 6,041,135, the disclosures of which are incorporated herein by reference. These methods do not incorporate the compression of data into the reconstruction algorithm.

Another area of active research of multiresolution methods in tomography is for regularization. As noted, iterative solvers such as the Conjugate Gradient method are a potentially effective means of solving Limited-Angle Tomography problems. One drawback, however, is that the linear systems of equations are severely ill-conditioned, if not rank-deficient, causing an iterative solver to converge to a solution slowly, if at all. Regularization and preconditioning techniques accelerate proper convergence, and wavelets have been used in such schemes, see e.g., David L. Donoho, "Nonlinear Solution of Linear Inverse Problems by Wavelet-Vaguelette Decomposition", Applied and Computational Harmonic Analysis, Vol. 2, Issue 2, pp. 101–126, April 1995; T. Olson, "Limited Angle Tomography Via Multiresolution Analysis and Oversampling", Time-Frequency and Time-Scale Analysis, 1992, Proceedings of the IEEE-SP International Symposium, pp. 215–218, 4–6 Oct. 1992; Sahiner, et al., "Limited Angle Tomography Using Wavelets", Nuclear Science Symposium and Medical Imaging Conference, 1993, Vol. 3, pp. 1912–1916, 31 Oct., 1993–6 Nov. 1993; W. Zhu, et al., "A Wavelet-Based Multiresolution Regularized Least Squares Reconstruction Approach for Optical Tomography", IEEE Tansactions on Medical Imaging, Vol. 16, Issue 2, pp. 210–217, April 1997; M. Bhatia, et al., "Wavelet Based Methods for Multiscale Tomographic Reconstruction", Engineering in Medicine and Biology Society, Proceedings, Vol. 1, pp. A2-A 3, 3–6 Nov. 1994; Natha, et al., "Wavelet Based compression and Denoising of Optical Tomography Data", Optics Communications, Vol. 167, Issues 1–6, pp. 37–46, 15 Aug. 1999; and U.S. Pat. No. 6,351,548, the disclosures of which are incorporated herein by reference. The linear system may still be prohibitively large, however, so that it is not even possible to store a representation of the matrix, see the above referenced patent application entitled "COMPACT STORAGE OF PROJECTION MATRIX FOR X-RAY CIRCUIT BOARD INSPECTION USING SEPARABLE OPERATORS," U.S. patent application Ser. No. 10/684,000, filed Oct. 10, 2003, U.S. Publication No. 2004/0120566, published Apr. 14, 2005.

In an industrial inspection system, it is desirable to process, reconstruct, and analyze very large amounts of limited angle projection data in real time. While currently known methods are capable of feature extraction, compression for storage, and regularization, none of them incorporate multiresolution compression into the reconstruction algorithm itself, as a means of reducing the copious amount of data that must be processed using e.g. the Conjugate Gradient method to obtain the solution to the Radon transform. Approaching this kind of method, some authors have used multiresolution decompositions as a means of solving elliptic, partial differential equations by compressing the matrix operator of such equations, see e.g., G. Beylkin, et al., "Fast Wavelet Transforms and Numerical Algorithms I", Beylkin, Comm. Pure and appl. Math., Vol. 44, pp. 141–183, 1991 and B. Alpert, et al., "Adaptive Solution of Partial Differential Equations in Multiwavelet Bases", Department of Applied Math, University of Colorado at Boulder, preprint 409, July 1999. The disclosures of which are incorporated herein by reference. This is not useful in tomography, however, as the projection matrix is already quite sparse. More useful, are emerging techniques for solving a linear system when the unkown coefficients are reconstructed in a compressed format. These methods, termed "adaptive", have been demonstrated for differential equations (see e.g., A. Cohen and R. Masson, "Wavelet Methods for Second-Order Elliptic Problems, Preconditioning, and Adaptivity", SIAM Journal on Scientific computing, Vol. 21, Number 3, pp. 1006–1026, 1999, the disclosure of which is incorporated herein by reference) but not in the context of ill-conditioned inverse problems such as tomography.

Accordingly, there is a need in the art for providing compressed storage of image data and efficiently reconstructing compressed images directly from such compressed image data.

BRIEF SUMMARY OF THE INVENTION

An embodiment of the present invention provides a method for reconstructing desired image data from image data corresponding to a plurality of detector images, the method comprising compressing the plurality of detector images, identifying a projection matrix which describes an ideal way in which an object under study is projected onto a detector, computing a modified projection matrix as a function of the projection matrix and a compression technique utilized in compressing the plurality of detected images, and reconstructing the desired image data using the compressed detector images and the modified projection matrix.

A further embodiment of the present invention provides a computer program product having a computer readable medium having computer program logic recorded thereon for reconstructing compressed desired image data directly from compressed image data corresponding to a plurality of detector images, the computer program product comprising code for compressing the plurality of detector images, code for identifying a projection matrix which describes an ideal way in which an object under study is projected onto a detector, code for computing a modified projection matrix as a function of the projection matrix and compression transformations corresponding to compression transformations used in the compressing the plurality of detected images, and code for reconstructing the compressed desired image data from the compressed detector images and the modified projection matrix without uncompressing the compressed detector images.

A still further embodiment of the present invention provides a system for reconstruction of images in compressed format, the system comprising a storage device storing detector images in a compressed form, the storage device also storing a modified projection matrix formed as a function of a projection matrix which describes an ideal way in which an object under study is projected onto a detector and compression transformations used in providing the detector images in the compressed form, and a processor operating under control of an instruction set to reconstruct desired image data from the detector images in the compressed form and the modified projection matrix, wherein the reconstructed desired image data is in compressed form.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1 shows a flow diagram of reconstruction of images in compressed format according to an embodiment of the present invention;

FIG. 5 shows a computer system adapted according to an embodiment of the present invention.

DETAILED DESCRIPTION OF THE INVENTION

Figure 2:
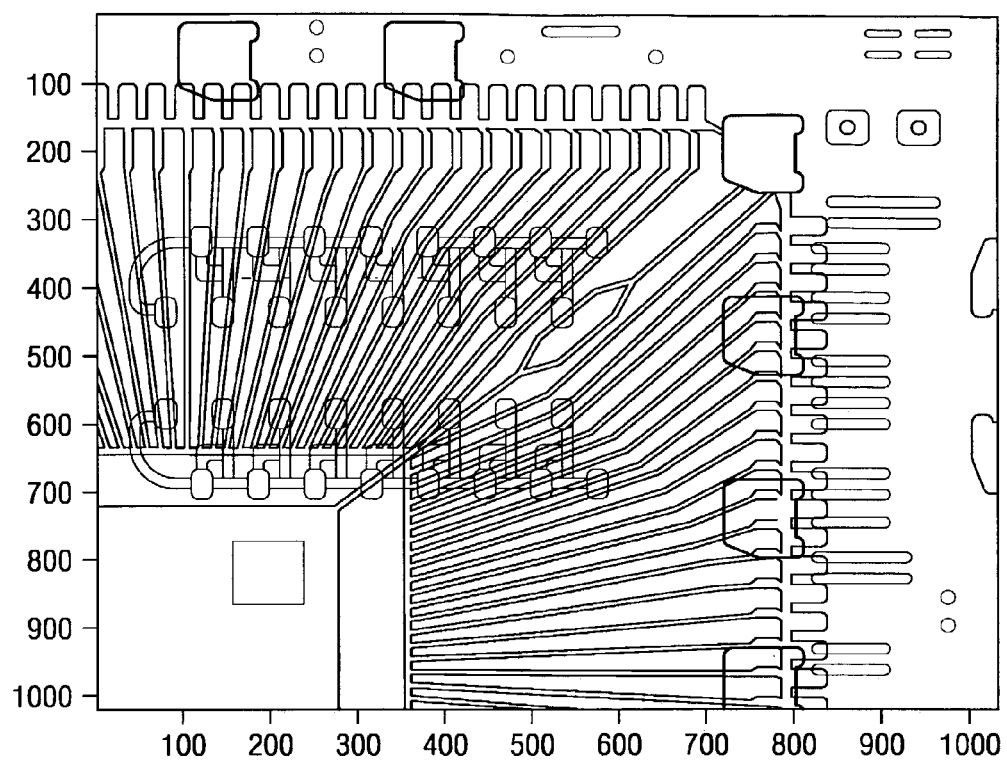
FIG. 2 illustrates a detector image as may be utilized in reconstruction of images according to embodiments of the present invention.

The present invention is directed toward systems and methods for providing efficient storage of image data and efficiently reconstructing images from such image data. Embodiments of the present invention reduce the number of unknowns that are computed in reconstructing a desired image by utilizing compression algorithms in the storage of detector image data and reconstructing desired images from compressed detector image data. Such reconstruction techniques provide advantages not only in that fewer unknowns are calculated in the reconstruction of the desired image, but also provide advantages in that the resulting reconstructed image is compressed.

Many algorithms (such as the well known jpeg and wavelet compression algorithms) exist for computing various compressed representations of image data. A number of such algorithms are well suited for the compression of imaging system detector images. Accordingly, image data provided by an imaging system may be efficiently stored for use in reconstructing desired images or views according to embodiments of the present invention.

Preferred embodiments of the present invention provide a reconstruction algorithm adapted to operate directly on compressed detector images, and to give as an output reconstructed images which are also in compressed format. According to such embodiments, a desired reconstructed image may be created from compressed detector images without constructing the full, uncompressed detector images or reconstructed image during intermediate steps.

Analysis suggests that the X-ray detector images that are common in industrial inspection imaging systems, such as those generated using the 5DX X-ray imaging system available from Agilent Technologies, may be compressed by a large factor using the aforementioned compression techniques, perhaps in combination with other compression techniques, as described in further detail herein. This suggests that the complexity of solving a linear system of equations during reconstruction of a desired image might also be reduced by large factors. Specifically, compression groups pixels together which share a common value and, in the ideal case, only one value need be computed for the reconstructed image to describe the whole group according to embodiments of the invention.

Typically, in order to have a compressed image, one must start with the full, uncompressed image, and derive from it a compression format which preserves accuracy. However, embodiments of the present invention reconstruct an unknown desired image directly into a compressed format without having first created an uncompressed rendition of the desired image. Accordingly, the structure of the reconstructed desired image compressed format is not known in advance. Reconstruction algorithms of preferred embodiments of the present invention are therefore adaptive to accommodate various structures, until a correct one is identified.

Embodiments of the present invention operate to reconstruct the aforementioned compressed desired image using compressed detector images. It should be appreciated that many of the problems present in the prior art techniques for reconstructing images are solved using the approach of such embodiments of the present invention. For example, embodiments of the present invention significantly reduce the amount of computer memory required to store images, thereby making it more feasible to archive images, save certain images for later inspection, etcetera. Similarly, the time of data transmission between components of the system may also be improved through the use of compression according to the present invention. Moreover, the reconstruction time may be decreased significantly, as compared to prior art techniques, because embodiments of the present invention do not need to compute each pixel separately.

Although a particular detector image compression factor (e.g., 200×) does not necessarily result in the time for creating a reconstructed image being accelerated by the same factor (200×), it does suggest that significant improvement in the reconstruction time may be expected. Some factors that determine the amount of acceleration realized may include the choice of compression scheme, the run-time overhead occurred in converting images to a compressed format, the run-time overhead occurred in using sparse or other data structures to represent the compressed images, the additional operations that might be utilized to make the algorithm adaptive, and the like.

In addition to reconstructing the aforementioned compressed desired image using compressed detector images, embodiments of the present invention may further operate to implement classification schemes, or other reconstructed image processing and/or analysis, directly on the compressed images, such as through comparison to a known exemplary. Accordingly, embodiments of the present invention may thus reduce post-processing time, such as the time during which the system determines whether the circuit board or other industrial item meets design criteria or is defective.

Directing attention to FIG. 1, steps of an embodiment of the present invention providing adaptive tomographic reconstruction of X-ray images in compressed format are shown. Step 101 of the illustrated embodiment provides compression of detector images. For example, "Daubechies" wavelets (well-known in the literature), such as with an "order" of 4, may be utilized in compression of detector images. Embodiments of the present invention may utilize other orthogonal compression schemes, such as Daubechies' wavelets, Coiflets, orthogonal wavelets, and multiwavelets.

After converting images into the wavelet basis (format) as discussed above, truncation may be utilized to compress the data. This is known as lossy compression. According to one embodiment, all numbers of the wavelet basis whose absolute value is less than a particular value, such as $10^{-3}$, may be replaced with a predetermined value, such as zero. Preferably, the amount of compression implemented with respect to any particular detector image is chosen such that the clarity of the image with respect to the features of interest thereof is not comprised. Experimentation has shown that, using the aforementioned truncation of normalized absolute values less than $10^{-3}$, compression rates in the range of 100× may be achieved with respect to detector images that originally consisted of 1024×1024 pixels.

According to one embodiment of the illustrated embodiment, after applying a compression technique, such as the aforementioned wavelet image conversion, all values of the detector image whose absolute value are below some threshold related to the desired image clarity are truncated. In addition to straightforward truncation techniques (hard thresholding), other methods for truncation or data reduction, as are well known in the art, may be applied to the images to reduce the total amount of data. For example, one might use different truncation values in different areas of the image (soft thresholding). Preferably, the resulting compressed image data is stored in a sparse data structure (such as are well known in the art). Sparse data structures (formats) differ from a pixel-based image formats, in that only a select few pixel values are stored, together with necessary encoded data to describe how the selected data may be combined to recreate the original image.

FIG. 2 illustrates a raw detector image taken using a 5DX X-ray imaging system available from Agilent Technologies. Application of a good compression scheme will return an image that looks very nearly identical to the raw image of FIG. 2. Accordingly, compression schemes utilized in providing compressed detector images according to the present invention use a compression factor having been selected such that the clarity of the image would not be compromised.

Referring again to FIG. 1, step 102 of the illustrated embodiment computes a modified projection matrix for use with compressed detector image data in reconstructing compressed desired images. In understanding the computation of a modified projection matrix of embodiments of the present invention, it is helpful to understand that the linear system of equations that are to be solved in a reconstruction algorithm can be written as:

$$Pf=b, \qquad (1)$$

where P is the "projection matrix" which describes the ideal way in which circuit boards, or other objects under study, are "projected" onto a detector by an X-ray source, f is a vector containing all of the unknown values, e.g., pixels and/or voxels (3D pixels), of the desired image of the circuit board, or other object under study, and b is a vector containing all of the known pixel values recorded by the imaging system detectors. Preferably, a projection matrix configuration such as shown and described in the above referenced patent application entitled "COMPACT STORAGE OF PROJECTION MATRIX FOR TOMOGRAPHY USING SEPARABLE OPERATORS," U.S. patent application Ser. No. 10/684,000, filed Oct. 10, 2003, U.S. Publication No. 20040120566, published Apr. 14, 2005.

In order to provide for compression of detector images (b as represented in the above equation) in a consistent way, both sides of equation (1) above may be multiplied by a orthogonal transformation matrix (W) that converts pixel values into the compressed format. Accordingly, equation (1) becomes:

$$WPf=Wb, \qquad (2)$$

where the transformation matrix W corresponds to a compression technique or techniques utilized in compression of detector images b.

According to embodiments of the present invention, the reconstructed images (f in the equations above) of the circuit board or other item are also to be represented in a compressed format. It should be appreciated that, for any "orthogonal" compression scheme (such as Daubechies' wavelets used in the example above):

$$WW^* = I, \quad (3)$$

where $W^*$ is the complex-conjugate transpose of W. Accordingly, equation (2) above may be rewritten as:

$$(WPW^*)(Wf) = (Wb). \quad (4)$$

Grouping together terms of equation (4) gives the following:

$$Qg = c \quad (5)$$

where $Q=(WPW^*)$, $g=(Wf)$, and $c=(Wb)$. Note that $g=Wf$ is a representation of f in a format that may be compressed.

A general procedure for solving equation (5) to obtain the unknown values for g may, according to embodiments of the present invention, include applying a compression (e.g., wavelet) transformation matrix to the detector images b, thus computing c as set forth with respect to step 101 discussed above. A modified projection matrix (Q) may be computed, as set forth in step 102, by computing a projection matrix (P), as is well known in the art, and converting the projection matrix (P) to the new basis by applying compression transformations to both rows and columns thereof, thus computing Q, $(Q=WPW^*)$.

According to one embodiment, after applying a compression technique, such as the aforementioned wavelets image conversion, all values of the projection matrix whose absolute value are below some threshold related to the desired image clarity are truncated, and the resulting data is stored in a sparse data structure.

Figure 3:
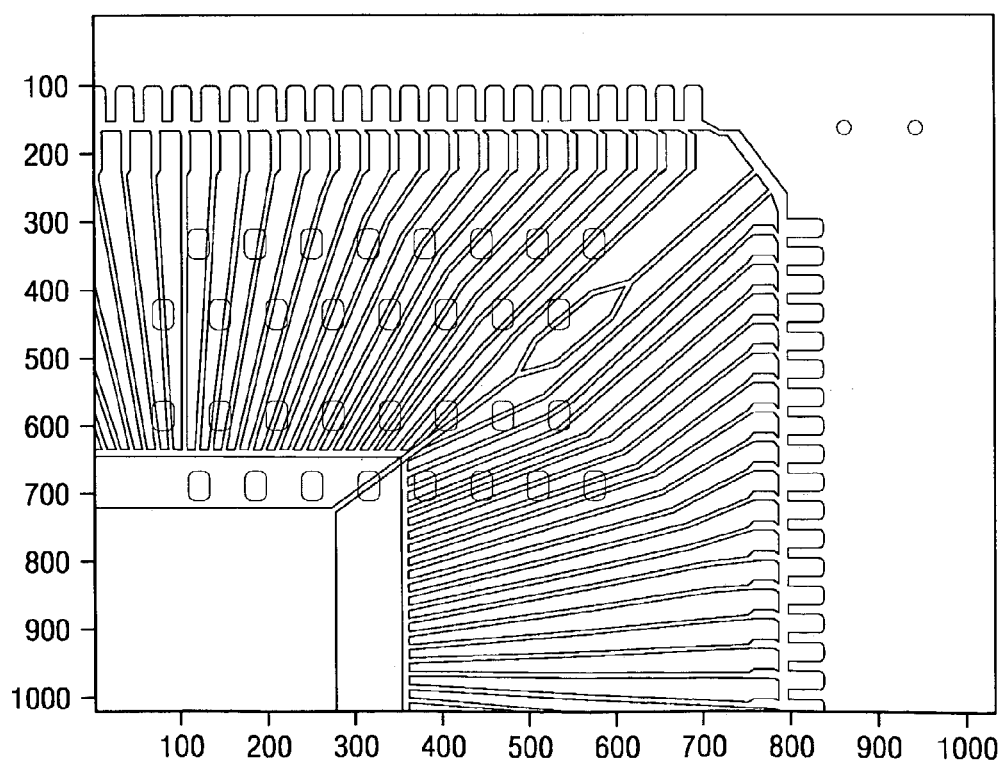
FIG. 3 illustrates a reconstructed image as may be provided according to embodiments of the present invention.

At step 103, the illustrated embodiment of the present invention solves for the vector (g) containing the unknown values of the compressed desired image of the circuit board, or other object under study, as is discussed in further detail below. FIG. 3 represents a compressed reconstructed desired image provided according to an embodiment of the present invention having a plurality of detector images, such as may include the compressed images corresponding to the image of FIG. 2, as an input.

Having solved for a compressed desired image (g), the desired image may be reproduced in uncompressed, e.g., pixel, form by applying $f=W^*g$, if desired. However, embodiments of the present invention utilize post processing techniques which operate directly upon the compressed reconstructed image, such as to determine if the circuit board, or other object under study, meets desired standards, etcetera. Additionally or alternatively, embodiments of the present invention may operate to analyze a compressed reconstructed image as an initial determination and thereafter, when such analysis indicates, reproduce the image in pixel or other uncompressed form for further, perhaps more detailed, analysis.

As discussed above, the unknown coefficient values of g are preferably solved using a suitable adaptive technique. In order to achieve desired efficiencies over the prior art technique of solving for reconstructed image values (f of equation (1) above) the operations implemented to obtain compressed reconstructed image values (g of equation (5) above), including implementation of the aforementioned adaptive techniques, are less than the operations to obtain desired reconstructed image values (f), thereby providing a net gain in speed and/or decreased demand upon computing resources.

Preferred embodiments of the present invention rely upon an iterative method for tomographic reconstruction; the Conjugate Gradient method, for example. It should be appreciated that the iterative methods implemented according to preferred embodiments of the present invention are particularly appropriate since they do not require that the matrix be changed during the process and they utilize only matrix-vector multiplication, which is relatively simple to implement.

Although any suitable iterative algorithm may be applied directly to equation (5) above to solve for g, preferred embodiments implement an adaptive algorithm in order to maintain efficiency. Specifically, as discussed with respect to steps 101 and 102, elements of c smaller than a given threshold may be truncated for compression. In general, it is not known how to truncate g until the values for that vector have been formed. However, by providing a good initial estimate of g, embodiments of the present invention can proceed in an iterative manner to arrive at g.

Figure 4:
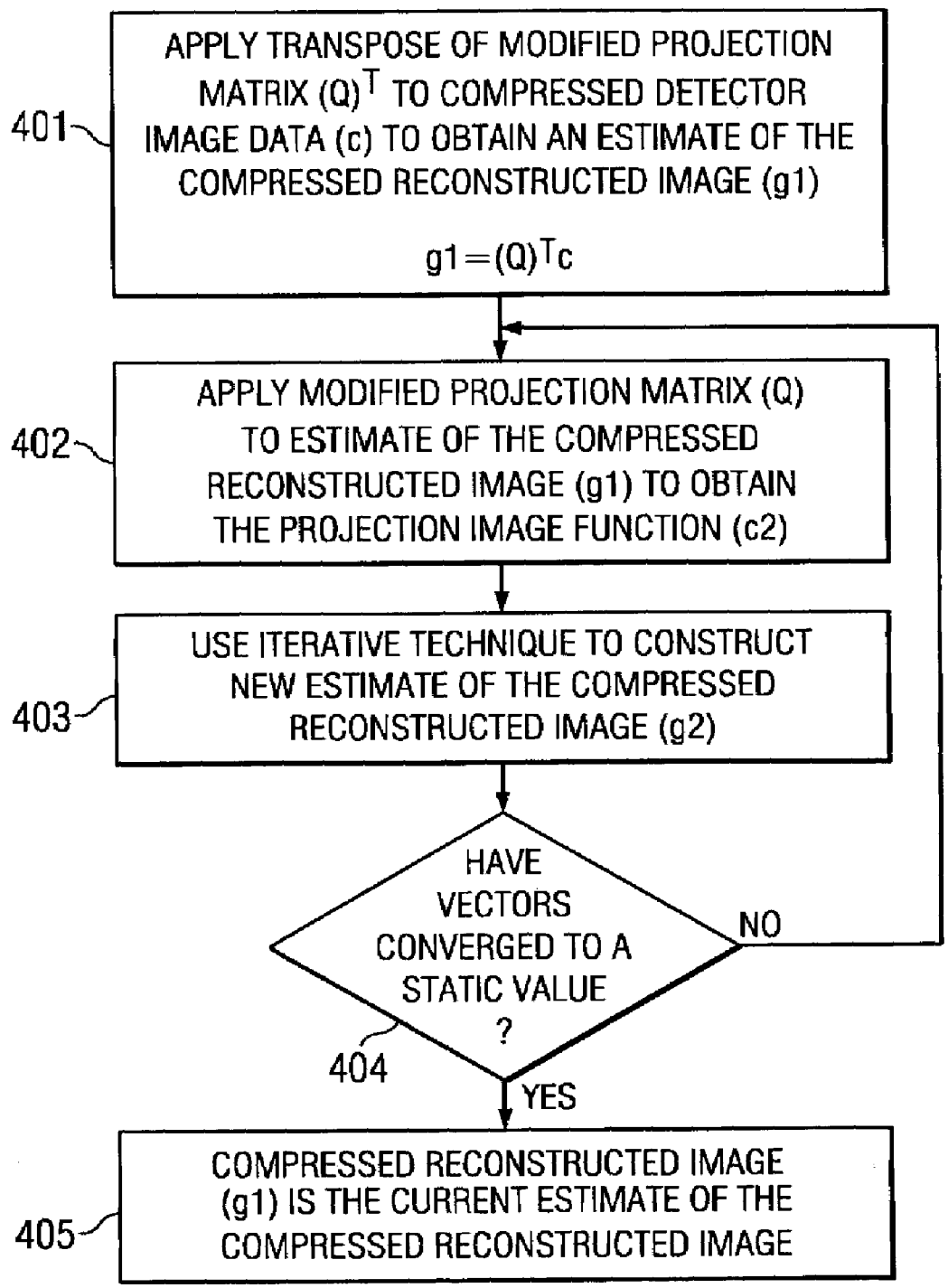
FIG. 4 shows a flow diagram of iterative processing to solve for reconstructed image data according to an embodiment of the present invention.

Directing attention to FIG. 4, steps of a preferred embodiment method for solving for a compressed reconstructed image (g), as provided for in step 103 of FIG. 1, are shown. At step 401 of the illustrated embodiment, the transpose of the modified projection matrix ($Q^T$) is applied to the compressed detector image data (c), thus forming an estimate of the compressed reconstructed image (g1, where $g1=Q^T_c$). This step may be the same as what are often known as "shift-and-add" procedures as may be implemented for digital tomosynthesis. For industrial article (e.g., circuit board) imaging systems, the resulting image g1 is a particularly good first approximation to g. Where truncation has been implemented with respect to the detector image data (c) and the modified projection matrix (Q), the estimate of the compressed reconstruction image (g1) is also preferably truncated using the same or related thresholding method.

At step 402, the modified projection matrix Q is applied to the estimate of the compressed reconstruction image g1 to obtain the projection image function (c2, such that $c2=Qg1$.

Thereafter, at step 403, steps are taken in accordance with the particular iterative algorithm implemented, such as the Conjugate Gradient method, to obtain a new estimate of the compressed reconstruction image (g2). It should be appreciated that the image g2 obtained from the multiplication (c2=Qg1) and subsequent processing, will accumulate additional terms that may increase the number of elements in g2, reducing sparsity and compression. Nevertheless, the image g2 may be truncated using a related thresholding scheme, so as to restore sparsity or compression efficiency. It should be appreciated that the location of terms that can be truncated is not known in advance, but are determined during the iterative procedure, so as to adapt to the particular estimate of the compressed reconstructed image.

At step 404 a determination is made as to whether the vectors have converged to a static value. For example, when the projection estimate c2 is substantially the same as the original projection data (c), it may be determined that these vectors have converged and, therefore, further iterative processing with respect to estimates of the compressed reconstructed image are not needed. If the vectors have converged to a static value, processing in the illustrated embodiment proceeds to step 405 wherein the compressed reconstructed image (g) is set to the current iteration of the estimate of the compressed reconstructed image (g2). However, if the vectors have not converted to a static value, processing in the illustrated embodiment proceeds again to step 402.

It should be appreciated that the steps of the embodiment illustrated in FIG. 4 maintain a constantly changing representation for (g), that is adapting to the increased accuracy of each iteration. Moreover, these changing representations for (g) are done according to the illustrated embodiment while maintaining the compression of (g), so that the matrix-vector multiplies in step 402 may be done in a fast manner. It should be appreciated that although the data is represented in a compressed format, the linear system of equations may be ill-conditioned, and the use of regularization methods, as are well-known in the prior art, may be used within the described iterative process.

It should be appreciated that, when elements of the present invention may essentially be code segments to perform the tasks as set forth herein. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of a computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etcetera. Computer data signals may include any signal that can propagate over a transmission medium such as electronic network channels, optical fibers, air, electromagnetic, RF links, etcetera. The code segments may be downloaded via computer networks such as the Internet, Intranet, etc.

FIG. 5 illustrates exemplary computer system 500 adapted to use the present invention. Central processing unit (CPU) 501 is coupled to system bus 502. The CPU 501 may be any general purpose CPU, such as a processor from the Intel PENTIUM family of processors. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art. Bus 502 is also coupled to input/output (I/O) adapter 505, communications adapter 511, user interface adapter 508, and display adapter 509.

I/O adapter 505 of the illustrated embodiment is coupled to image detectors 517, such as may provide detector image data utilized according to the present invention, and X-ray emitter, such as may be controlled to illuminate an item, such as a circuit board, for stimulation of image detectors 517 as is well known in the art. I/O adapter 505 of the illustrated embodiment is further coupled to storage devices 506, such as one or more of a hard drive, a CD drive, a floppy disk drive, a tape drive, to the computer system. Printer 514, which would allow the system to print paper copies of information such as document, photographs, articles, etcetera, is also shown coupled to I/O adapter 505. Note that printer 514 may be a printer (e.g. dot matrix, laser, etc.), a fax machine, a copier machine, or the like.

Communications adapter 511 is adapted to couple computer system 500 to network 512. Network 512 may comprise one or more of a telephone network, a local area network (LAN), a metropolitan area network (MAN), a wide area network (WAN), an intranet, the Intranet, a wireless network, and/or the like.

User interface adapter 508 couples user input devices, such as keyboard 513, pointing device 507, and microphone 516, to the computer system 500. User interface adapter 508 may additionally or alternatively provide output to a user, such as via speaker(s) 515. Similarly, display adapter 509 provides output to a user, such as by driving information display upon display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reconstructing desired image data from image data corresponding to a plurality of detector images, said method comprising:
   converting said plurality of detector images into a wavelet basis;
   compressing said plurality of converted detector images;
   identifying a projection matrix which describes an ideal way in which an object under study is projected onto a detector;
   computing a modified projection matrix as a function of said projection matrix and a wavelet technique utilized in converting said plurality of detected images; and
   reconstructing said desired image data using said compressed detector images and said modified projection matrix, wherein said reconstructed desired image data provides said desired image data in a compressed format.

2. The method of claim 1, wherein said reconstructing said desired image data comprises:
   applying a transpose of said modified projection matrix to said compressed detector images, thereby obtaining an estimate of said desired image data.

3. The method of claim 2, wherein said reconstructing said desired image data further comprises:
   iteratively increasing an accuracy of said estimate of said desired image data until application of said modified projection matrix thereto indicates convergence upon said desired image data.

4. The method of claim 2, wherein said reconstructing said desired image data further comprises:
   applying said modified projection matrix to said estimate of said desired image data, thereby obtaining a projection image function;
   compressing the projection image function to attempt to obtain a compressed projection image function size corresponding to a size of said estimate of said desired image data; determining if said projection image function and said estimate of said desired image data have converged; and
   if said projection image function and said estimate of said desired image data have not converged, repeating said applying said transpose of said modified projection matrix with respect to said estimate of said desired image data, thereby obtaining a new estimate of said desired image data.

5. The method of claim 1, wherein said computing said modified projection matrix comprises converting the projection matrix to a new basis by applying compression transformations corresponding to compression transformations used in said compressing said plurality of detected images to both rows and columns of said projection matrix.

6. The method of claim 1, further comprising:
making a determination with respect to an object to which said detected images correspond meeting desired criteria from said desired image data in compressed format.

7. The method of claim 6, further comprising: uncompressing said reconstructed desired image data for further analysis when said determination with respect to said object to which said detected images correspond does not meet said desired criteria.

8. A computer program product having a computer readable medium having computer program logic recorded thereon for reconstructing compressed desired image data directly from compressed image data corresponding to a plurality of detector images, said computer program product comprising:
code for converting said plurality of detector images into a wavelet basis;
code for compressing said plurality of converted detector images;
code for identifying a projection matrix which describes an ideal way in which an object under study is projected onto a detector;
code for computing a modified projection matrix as a function of said projection matrix and a wavelet function used in said converting said plurality of detected images; and
code for reconstructing said compressed desired image data from said compressed detector images and said modified projection matrix without uncompressing said compressed detector images.

9. The computer program product of claim 8, wherein said code for reconstructing said desired image data comprises:
code for estimating said desired image data for iterative processing to arrive at said desired image data.

10. The computer program product of claim 9, wherein said code for estimating said desired image data comprises:
code for applying a transpose of said modified projection matrix to said compressed detector images.

11. The computer program product of claim 9, wherein said reconstructing said desired image data further comprises:
code for iteratively increasing an accuracy of said estimate of said desired image data until said desired image data is arrived at.

12. The computer program product of claim 9, wherein said code for reconstructing said desired image data further comprises:
code for applying said modified projection matrix to said estimate of said desired image data, thereby obtaining a projection image function;
code for determining if said projection image function and said estimate of said desired image data have converged; and
code for repeating said applying said modified projection matrix with respect to said estimate of said desired image data, if said projection image function and said estimate of said desired image data have not converged.

13. A system for reconstruction of images in compressed format, said system comprising:
a storage device storing detector images in a compressed form, said storage device also storing a modified projection matrix formed as a function of a projection matrix which describes an ideal way in which an object under study is projected onto a detector and compression transformations used in providing said detector images in said compressed form, wherein said detector images and said projection matrix are in a wavelet basis, and wherein said detector images are further compressed; and
a processor operating under control of an instruction set to reconstruct desired image data from said stored detector images in said compressed form and said modified projection matrix, wherein said reconstructed desired image data is reconstructed in a wavelet basis and in a compressed form.

14. The system of claim 13, wherein said system comprises an industrial product imaging system providing real-time imaging of objects of interest.

15. The system of claim 14, wherein said storage device further stores exemplary object data in compressed form for comparison to said reconstructed desired image data in compressed form in real-time.

* * * * *